US011115795B2

(12) United States Patent
Sylwander et al.

(10) Patent No.: US 11,115,795 B2
(45) Date of Patent: Sep. 7, 2021

(54) EARLY ACTIVATION OF MOBILE DEVICE TO ENABLE USE AT SERVICE TERMINAL

(71) Applicant: CRUNCHFISH PROXIMITY AB, Malmö (SE)

(72) Inventors: Kristian Sylwander, Malmö (SE); Joachim Samuelsson, Helsingborg (SE)

(73) Assignee: CRUNCHFISH DIGITAL CASH AB, Malmö (SE)

(*) Notice: Subject to any disclaimer, the term of this patent is extended or adjusted under 35 U.S.C. 154(b) by 0 days.

(21) Appl. No.: 16/765,602

(22) PCT Filed: Nov. 16, 2018

(86) PCT No.: PCT/SE2018/051184
§ 371 (c)(1),
(2) Date: May 20, 2020

(87) PCT Pub. No.: WO2019/103682
PCT Pub. Date: May 31, 2019

(65) Prior Publication Data
US 2020/0304977 A1   Sep. 24, 2020

(30) Foreign Application Priority Data
Nov. 21, 2017 (SE) .................... 1751432-4

(51) Int. Cl.
*H04W 4/24* (2018.01)
*H04W 4/80* (2018.01)
(Continued)

(52) U.S. Cl.
CPC .............. *H04W 4/80* (2018.02); *H04H 60/09* (2013.01); *H04W 4/021* (2013.01); *H04W 4/023* (2013.01); *H04W 8/005* (2013.01)

(58) Field of Classification Search
CPC ......... H04W 4/02; H04W 4/20; H04W 4/021; H04W 4/023; H04W 4/80; H04W 8/005; H04H 60/09; G06Q 30/0281
See application file for complete search history.

(56) References Cited

U.S. PATENT DOCUMENTS 5,852,630 A * 12/1998 Langberg ............ H04L 27/2647
375/219
10,187,398 B2 * 1/2019 Woo ......................... G01S 1/68
(Continued)

FOREIGN PATENT DOCUMENTS

EP      1445894 A2    8/2004
EP      2453713 A1    5/2012
(Continued)

OTHER PUBLICATIONS

International Search Report and Written Opinion issued in corresponding International Application No. PCT/SE2018/051184 dated Dec. 3, 2018, all enclosed pages cited.
(Continued)

*Primary Examiner* — Siu M Lee
(74) *Attorney, Agent, or Firm* — Burr & Forman, LLP

(57) ABSTRACT

A communication system (100) comprises a service terminal (ST) and a first transmitter function (TX1) in or at the service terminal (ST). The first transmitter function (TX1) is configured for sending a first short-range wireless communication signal (S1) to cause a first reaction (R1) when received by a mobile device (MD) being located within a first distance (D1) or distance range (DR1) from the service terminal (ST). The communication system (100) also comprises a second transmitter function (TX2) in or at the service terminal (ST). The second transmitter function (TX2) is configured for sending a second short-range wireless communication signal (S2) to cause a second reaction (R2) when received by the mobile device (MD) being located within a second distance (D2) or distance range (DR2) from the service terminal (ST), the second distance (D2) or distance range (DR2) being closer to the service terminal (ST) than the first distance (D1) or distance range (DR1).

52 Claims, 10 Drawing Sheets

(51) Int. Cl.
    *H04H 60/09*     (2008.01)
    *H04W 4/021*     (2018.01)
    *H04W 4/02*     (2018.01)
    *H04W 8/00*     (2009.01)

(56) References Cited

U.S. PATENT DOCUMENTS

| | | | |
|---|---|---|---|
| 2002/0077060 A1 | 6/2002 | Lehikoinen | |
| 2011/0164595 A1* | 7/2011 | So | H04W 12/06 370/338 |
| 2015/0141103 A1* | 5/2015 | Gallagher | A63F 13/80 463/9 |
| 2016/0066123 A1* | 3/2016 | Ko | H04W 4/02 455/41.1 |
| 2016/0212582 A1* | 7/2016 | Jin | H04W 4/02 |
| 2016/0346617 A1* | 12/2016 | Srugo | G09B 19/0038 |

FOREIGN PATENT DOCUMENTS

| | | |
|---|---|---|
| WO | 2017065682 A1 | 4/2017 |
| WO | 2017091132 A1 | 6/2017 |
| WO | 2017095307 A1 | 6/2017 |

OTHER PUBLICATIONS

European Search Report issued in corresponding International Application No. PCT/SE2018/051184 dated Jul. 20, 2021, all enclosed pages cited.

\* cited by examiner

EARLY ACTIVATION OF MOBILE DEVICE TO ENABLE USE AT SERVICE TERMINAL

TECHNICAL FIELD

The present invention generally relates to services provided by service terminals for use by mobile devices and their users, wherein short-range wireless communication signals are used in order to determine proximity between the mobile devices and the service terminals. More specifically, the invention relates to a communication system comprising a service terminal having first and second transmitter functions for short-range wireless communication. The invention also relates to a method of activating a mobile device to enable use of a service associated with a service terminal. The invention further relates to a mobile computing device for implementing the functionality of the mobile device in the method, and to a computing device for implementing the functionality of the service terminal in the method.

BACKGROUND

Along with the overwhelming market penetration of mobile devices such as smartphones and tablets during the last decade, it has become generally desirable to be able to use mobile devices also as tools for accessing services provided by service terminals at physical premises. Some typical scenarios include digital order, digital payment or digital promotion at retail shops, supermarkets, arenas, events or public transportations, wherein the service terminal may be a point-of-sales terminal, checkout counter, delivery pickup point, vending machine, ticket machine, etc.

WO 2017/095307 discloses a method and a communication system in which a service terminal provides a service to a user of a mobile device. The service terminal is associated with a transmitter of a short-range wireless communication signal in the form of a beacon signal that identifies a beacon region. When the mobile device approaches the service terminal and receives the beacon signal, it sends a report to a system server by broadband data communication that includes information indicative of a received signal strength. The service terminal communicates with the system server to obtain an estimated distance between the service terminal and the mobile device, and also to obtain user profile data of the user of the mobile device. The service terminal provides the service to the user of the mobile device based on the estimated distance and the user profile data. The service terminal may, for instance, be a point-of-sales terminal and the service may involve a monetary transaction (i.e. a payment for a purchase made by the user of the mobile device at the point-of-sales terminal). Alternatively, the service terminal may, for instance, be a digital signage terminal and the service may involve presentation of customized digital content to the user of the mobile device.

To facilitate the understanding of some embodiments of the present invention, a summary of Bluetooth Low Energy (BLE, a well-spread technology for short-range wireless communication) and beacon technology based on BLE will now be given.

The iBeacon technology from Apple allows for mobile devices to understand their location on a micro-local scale, and also allows delivery of hyper-contextual content to the users of mobile devices based on their current location. The iBeacon technology is based on the BLE standard, and more particularly on Generic Access Profile (GAP) advertising packets. There are several other kinds of short-range wireless beacon technologies, for instance AltBeacon, URIBeacon and Eddystone, which are also based on BLE and GAP.

In a basic short-range wireless beacon communication system based on the BLE standard, a beacon transmitter device repeatedly broadcasts a short-range wireless beacon advertisement signal in a 31-byte GAP BLE packet. The beacon advertisement signal contains a 128-bit universally unique identifier, UUID. The beacon advertisement signal may also include a 16-bit major portion and a 16-bit minor portion. The beacon signal identifies a beacon region associated with the beacon transmitter device. Whereas, as is commonly known, a geographical region is an area defined by a circle of a specified radius around a known point on the Earth's surface, a beacon region is in contrast an area defined by a mobile device's proximity to one or more beacon transmitter devices.

In some implementations, the beacon region is represented by the UUID, the major portion and the minor portion in the beacon advertisement signal. In other implementations, the beacon region is represented by the UUID and the major or minor portion in the beacon signal. In still other implementations, the beacon region is represented by the UUID alone.

To be able to receive the short-range wireless beacon signal when being within range of a beacon transmitter device, each mobile device is provided with an application program, app, which is configured to detect and react on short-range wireless beacon signals, such as the aforementioned beacon advertisement signal, with support from the underlying operating system. In one known beacon technology, the apps in mobile devices can detect and react on beacons in two ways, monitoring and ranging. Monitoring enables the app to detect movement in and out of the beacon region (i.e., whether the mobile device is within or outside of the range of any of the beacon transmitter devices with which the beacon region is associated). Hence, monitoring allows the app to scan for beacon regions. Ranging is more granular and provides a list of beacon transmitter devices in range, together with their respective received signal strength, which may be used to estimate a distance to each of them. Hence, ranging allows the app to detect and react on individual beacon transmitter devices in a beacon region.

These apps may be handled by the operating system of the mobile device in different modes. The most prominent mode is the active mode, in which the app executes in the foreground and is typically capable of interacting with the user of the mobile device and also to communicate with an external device such as a server via the short-range wireless beacon interface and/or another communication interface. As regards short-range wireless beacon communication, ranging typically only works when the app is in active mode.

When a mobile device receives the beacon advertisement signal, the app in the mobile device may detect that it has entered the beacon region from the UUID (and the major/minor as the case may be) contained in the beacon advertisement signal, and react as appropriate in some way which is beneficial to the user and/or the host of the beacon transmitter device and which often involves interaction between the app in the mobile device and a service provider over a broadband communication network. A system server may also be included in some implementations.

Examples of such beneficial use include, without limitation, determining a current approximate position of the mobile device by retrieving a predefined position of the beacon transmitter device from the service provider or by cross reference with local lookup data, or retrieving content from the service provider.

A mobile device where the app is in active mode is referred to as an active mobile device in this document. An active mobile device may receive and react to additional transmissions of the beacon advertisement signal from the beacon transmitter device; this may be useful for instance if the content associated with the host of the beacon transmitter device is updated or changed.

Furthermore, an active mobile device may receive and react to beacon advertisement signals from other beacon transmitter devices nearby, provided of course that they are within range of the respective beacon transmitter device, or move closer to it. This is so irrespective of whether the different beacon transmitter devices advertise the same beacon region (i.e. contain the same UUID and major/minor in the respective beacon advertisement signals), or different beacon regions (provided that the app is configured to monitor for such different beacon regions). It is to be noticed that the same beacon region (e.g. same UUID) is very often used for different beacon transmitter devices hosted by the same host, such as within the same supermarket, arena, fastfood restaurant, etc.

The operating system of the mobile devices may also handle apps in a passive mode. A purpose of the passive mode is power preservation, since the mobile devices are typically powered by batteries and since it is a general technical ambition to maximize the operational time of a mobile device between successive charging sessions. In the passive mode, the app executes in the background or is only installed on the mobile device. Monitoring works when the app is in active mode as well as when the app is in passive mode, whereas ranging may only work when the app is in active mode, or may only work for a limited time period when the app is in passive mode.

Transitions between active mode and passive mode may be based on user interaction, user preference settings in the app or the operating system, or program logic in the app or the operating system.

A mobile device where the app is in passive mode is referred to as a passive mobile device in this document. In the passive mode, the app typically cannot interact with the user via the user interface, nor communicate with a server or another device except for the following. Just like active mobile devices, a nearby passive mobile device may monitor for a beacon region and hence receive a short-range wireless beacon advertisement signal if it is within range of the beacon transmitter device in question. However, unlike active mobile devices, the passive mobile device will not be able to use ranging functionality to estimate a distance to the beacon transmitter device.

As always, speed is of essence when a service is to be provided by a service terminal to a mobile device, be it in the method and communication system of the aforementioned WO 2017/095307, or in numerous other possible situations and setups. The procedure for performing the service may not take too long, or else the users will probably be discouraged from using the service again. A delay in the performance of the service may not just cause a bad experience to the user itself, but it may also cause further delays in the logistics behind the service. For instance, when several users of mobile devices want to use the same service terminal, a delay in the performance of the service for a particular user will cause delays and growing queues also to other users who are waiting to use the service. Also, a delay in the performance of the service may mean that an operator of the service terminal may have to spend time waiting for the completion of the service as opposed to doing useful work in preparation of the performance of the service for the next user.

The present inventors have realized that there are problems to be solved and technical improvements to be made in this regard.

For instance, in order for the service to be performed promptly, the mobile device may have to be activated (awakened) from passive mode to active mode in situations where functionality which is only available in the active mode will be required to perform or complete the service. Such activation may take some time.

Furthermore, in many cases it is desirable that the service be provided only when the mobile device is very near the service terminal. This may be so because the service terminal (or its operator) needs to be certain that it will provide the service to the correct mobile device (or its user), and not to other mobile devices nearby (such as those which are waiting to be serviced after the present mobile device).

A related example is when as part of the service a digital handshake needs to be made between the mobile device and the service terminal as an affirmative action in order for the service to be completed. The digital handshake is made physically by presenting the mobile device very close to the service terminal (within, for instance, 10-30 cm or 5-50 cm), and logically by one or both of the mobile device and service terminal verifying the respective identity of the other device/terminal. This may involve communication of identity information over short-range wireless communication, or alternatively (and often preferably) by the respective devices communicating such identity information to a remote server resource over secure broadband data communication and avoiding transfer of identity information over short-range wireless communication.

The range of the short-range wireless communication signal from the transmitter of the service terminal may be much longer than the desired proximity between the mobile device and the service terminal, like about 5-25 meters or 10-100 meters as compared to 10-30 cm or 5-50 cm. Hence, there may be a need for the mobile device to determine its current distance to the service terminal. Again, this may require that the mobile device is awakened from passive mode to active mode, so that ranging functionality can be used for determining the current distance to the service terminal based on the received signal strength of the short-range wireless communication signal from the transmitter of the service terminal.

The above is illustrated in FIGS. 1A-1C. A user U of a mobile device wants to use a service 2 provided by a service terminal ST and/or an operator O thereof. In FIG. 1A, the mobile device MD and user U are at a distance D from the service terminal ST. Irrespective of whether or not the mobile device MD is within range of a short-range wireless communication signal from the service terminal ST, no service is yet to be provided to the mobile device MD or its user U, because the distance D is too far.

In FIG. 1B, the user U moves the mobile device MD closer to the service terminal ST and is now at a shorter distance D'. However, the distance is still too far, and the service is still not to be provided.

Only once the user U has moved the mobile device MD much closer to the service terminal ST, i.e. at only a small distance D", will the service terminal ST and/or its operator O provide the service 2 to the mobile device MD or its user U. This is seen in FIG. 1C.

As is clear from the above description, the present inventors have identified problems and shortcomings with the prior art. In line with the observations above, the present inventors have identified both the need for and the benefits of early activation of mobile devices to enable use of services provided at service terminals.

SUMMARY

It is accordingly an object of the invention to solve, eliminate, alleviate, mitigate or reduce at least some of the problems and shortcomings referred to above.

A first aspect of the present invention is a communication system which comprises a service terminal and a first transmitter function in or at the service terminal. The first transmitter function is configured for sending a first short-range wireless communication signal to cause a first reaction when received by a mobile device being located within a first distance or distance range from the service terminal.

The communication system moreover comprises a second transmitter function in or at the service terminal. The second transmitter function is configured for sending a second short-range wireless communication signal to cause a second reaction when received by the mobile device being located within a second distance or distance range from the service terminal. The second distance or distance range is closer to the service terminal than the first distance or distance range.

The communication system also comprises the aforementioned mobile device. The mobile device is configured for, while approaching the service terminal, receiving the first short-range wireless communication signal when being located within the first distance or distance range from the service terminal, and reacting to the receiving of the first short-range wireless communication signal by performing a first activity.

The mobile device is moreover configured for, while approaching closer to the service terminal and conditionally upon having performed the first activity, receiving the second short-range wireless communication signal, and reacting to the receiving of the second short-range wireless communication signal by performing a second activity when being located within the second distance or distance range from the service terminal.

Advantageously, the first activity involves preparations for the second activity, whereas the second activity involves participation in a service associated with the service terminal.

Hence, a communication system with improved ability to activate a mobile device and enable use of a service associated with a service terminal has been provided.

A second aspect of the present invention is a method of activating a mobile device to enable use of a service associated with a service terminal. The method involves sending a first short-range wireless communication signal to cause a first reaction when received by the mobile device being located within a first distance or distance range from the service terminal.

The method furthermore involves sending a second short-range wireless communication signal to cause a second reaction when received by the mobile device being located within a second distance or distance range from the service terminal. The second distance or distance range is closer to the service terminal than the first distance or distance range.

While approaching the service terminal, the mobile device receives the first short-range wireless communication signal when being located within the first distance or distance range from the service terminal, and reacts to the receiving of the first short-range wireless communication signal by performing a first activity. While approaching closer to the service terminal and conditionally upon having performed the first activity, the mobile device receives the second short-range wireless communication signal, and reacts to the receiving of the second short-range wireless communication signal by performing a second activity when being located within the second distance or distance range from the service terminal.

Accordingly, an improved method of activating a mobile device to enable use of a service associated with a service terminal has been provided.

A third aspect of the present invention is a mobile computing device comprising a controller, a short-range wireless communication interface and a long-range broadband communication interface. The controller is configured for performing the functionality defined for the mobile device in the method according to the second aspect of the present invention.

A fourth aspect of the present invention is a computing device comprising a controller, a first transmitter function for short-range wireless communication, a second transmitter function for short-range wireless communication and a long-range broadband communication interface. The controller is configured for performing the functionality defined for the service terminal in the method according to the second aspect of the present invention.

Other aspects, objectives, features and advantages of the disclosed embodiments will appear from the following detailed disclosure, from the attached dependent claims as well as from the drawings. Generally, all terms used in the claims are to be interpreted according to their ordinary meaning in the technical field, unless explicitly defined otherwise herein.

All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1A:
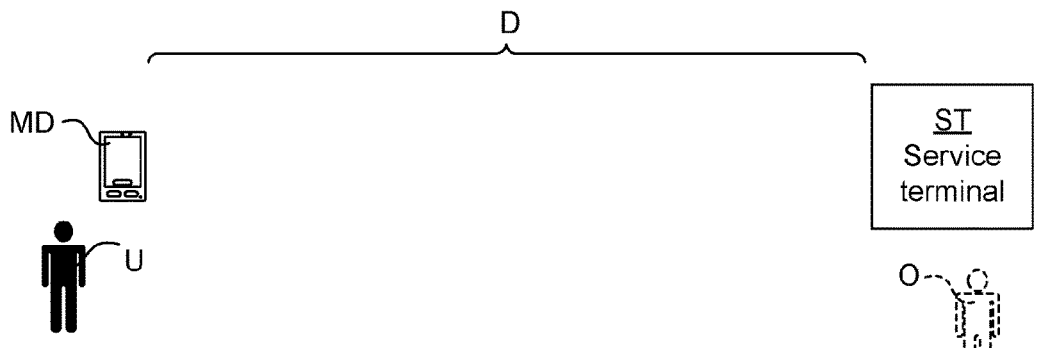
FIGS. 1A-1C illustrate a proximity-based way of providing a service by a service terminal and/or an operator thereof to a user of a mobile device generally in accordance with the prior art.
Figure 1B:
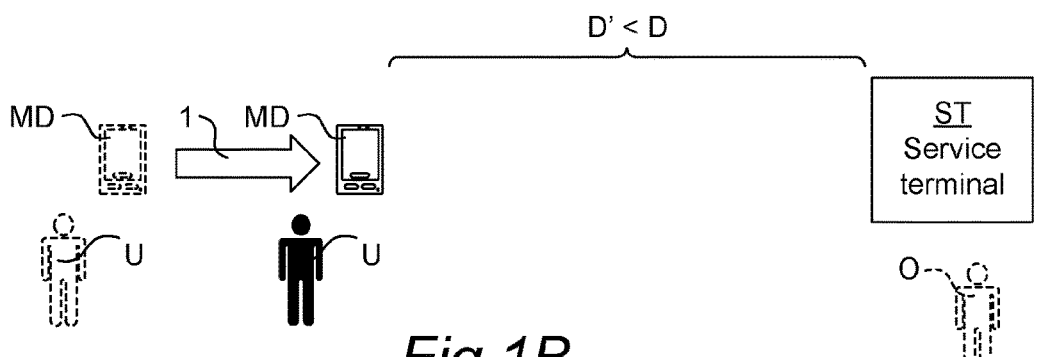
Figure 1C:
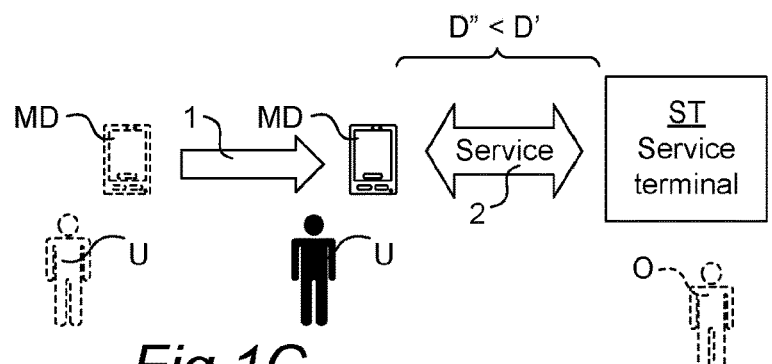
Figure 2A:
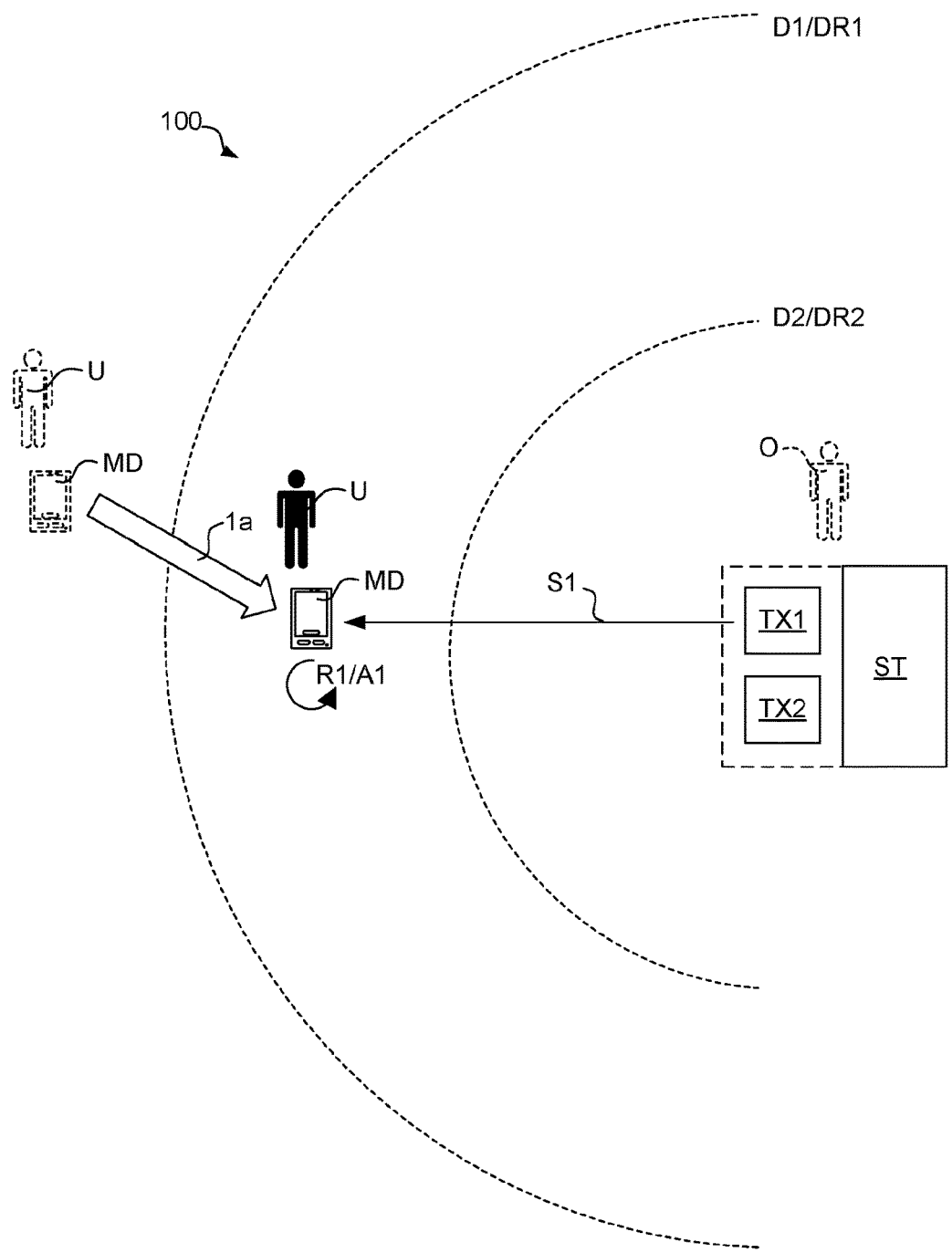
FIG. 2A illustrates a communication system generally according to the present invention, showing that a first transmitter function of a service terminal sends a first short-range wireless communication signal to cause a first reaction when received by a mobile device being located within a first distance or distance range from the service terminal.
Figure 2B:
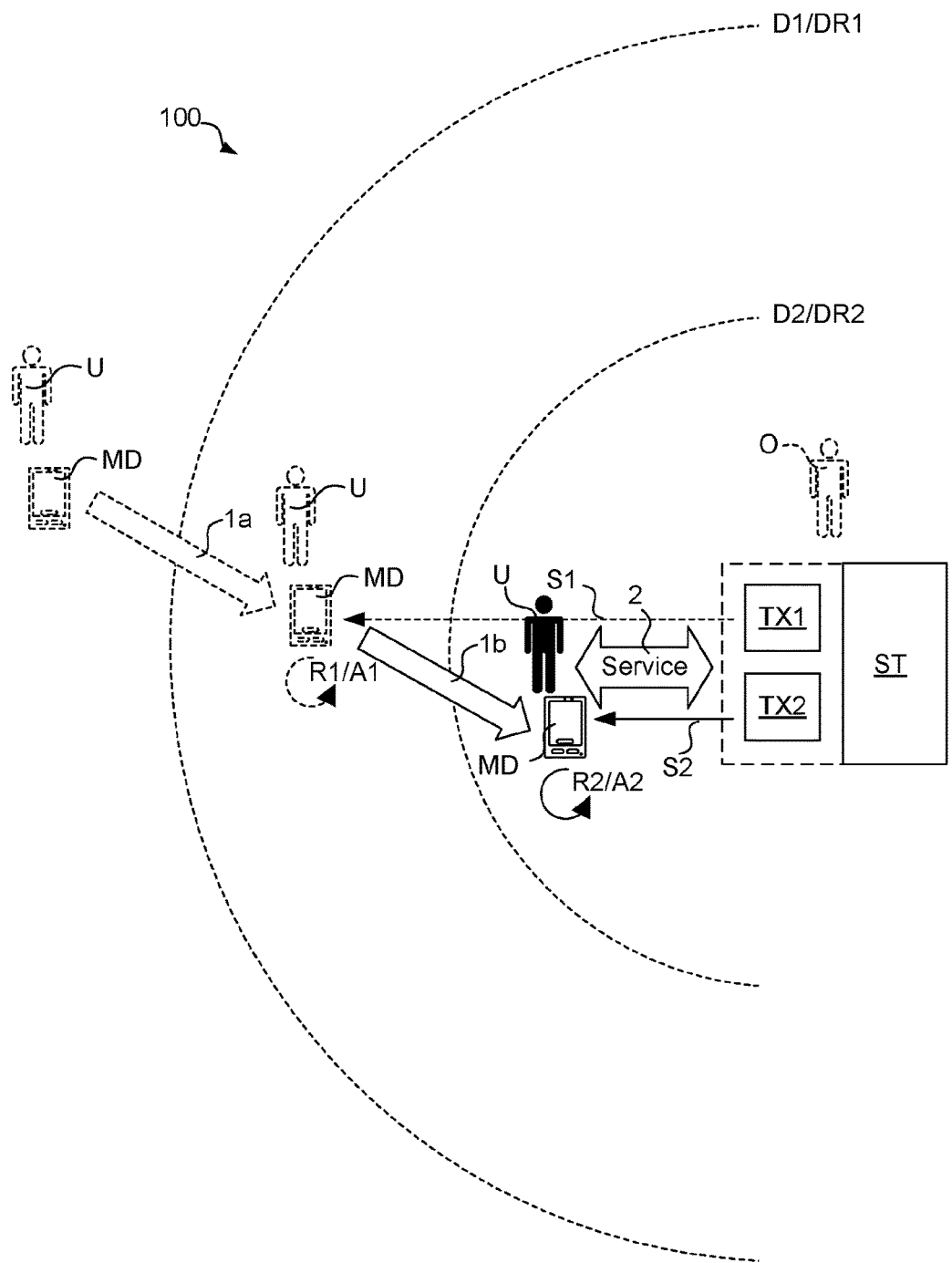
FIG. 2B illustrates the communication system of FIG. 2A, but now showing that a second transmitter function of the service terminal sends a second short-range wireless communication signal to cause a second reaction when received by the mobile device being located within a second distance or distance range from the service terminal, closer to the service terminal than the first distance or distance range. The second reaction involves participation in a service associated with the service terminal, and the first reaction may involve preparations for this service.

Reference is first made to FIG. 2A and FIG. 2B which illustrate a communication system 100 generally according to the present invention. The communication system 100 comprises a service terminal ST which may provide a service 2 to a mobile device MD or its user U. The service terminal may operate as an autonomous device, or alternatively under the control of or assistance by a human operator O. Examples of services for the service 2 will be given later in this section.

The communication system 100 also comprises a first transmitter function TX1 in or at the service terminal ST. The first transmitter function TX1 is configured for sending a first short-range wireless communication signal S1 to cause a first reaction R1 when received by a mobile device MD being located within a first distance D1 or distance range DR1 from the service terminal ST.

Moreover, the communication system 100 comprises a second transmitter function TX2 in or at the service terminal ST. The second transmitter function TX2 is configured for sending a second short-range wireless communication signal S2 to cause a second reaction R2 when received by the mobile device MD being located within a second distance D2 or distance range DR2 from the service terminal ST. The second distance D2 or distance range DR2 is closer to the service terminal ST than the first distance D1 or distance range DR1. For instance, and subject to the needs and constraints of an actual implementation, the first distance range DR1 may be 1-50 m, or more preferably 2-10 m, without limitation, and the first distance D1 may be a distance within the first distance range DR1. Likewise, the second distance range DR2 may be 5-50 cm, or more preferably 10-30 cm, without limitation, and the second distance D2 may be a distance within the second distance range DR2.

As is illustrated in FIG. 2A, when the user U moves 1a the mobile device MD, it will approach the service terminal ST. The mobile device MD is configured, when being located within the first distance D1/distance range DR1 from the service terminal ST, for receiving the first short-range wireless communication signal S1 from the first transmitter function TX1. The mobile device MD is further configured for reacting R1 to the receiving of the first short-range wireless communication signal S1 by performing a first activity A1.

As is illustrated in FIG. 2B, when the user U continues to move 1b the mobile device MD, it will approach closer to the service terminal ST. The mobile device MD is configured for receiving the second short-range wireless communication signal S2, and for reacting R2 to the receiving of the second short-range wireless communication signal S2 by performing a second activity A2 when being located within the second distance D2 or distance range DR2 from the service terminal ST. Advantageously, this may be made conditional upon having performed the first activity A1.

Advantageously, the first activity A1 involves preparations for the second activity A2, whereas the second activity A2 involves participation in the service 2 which is associated with the service terminal ST.

Figure 3:
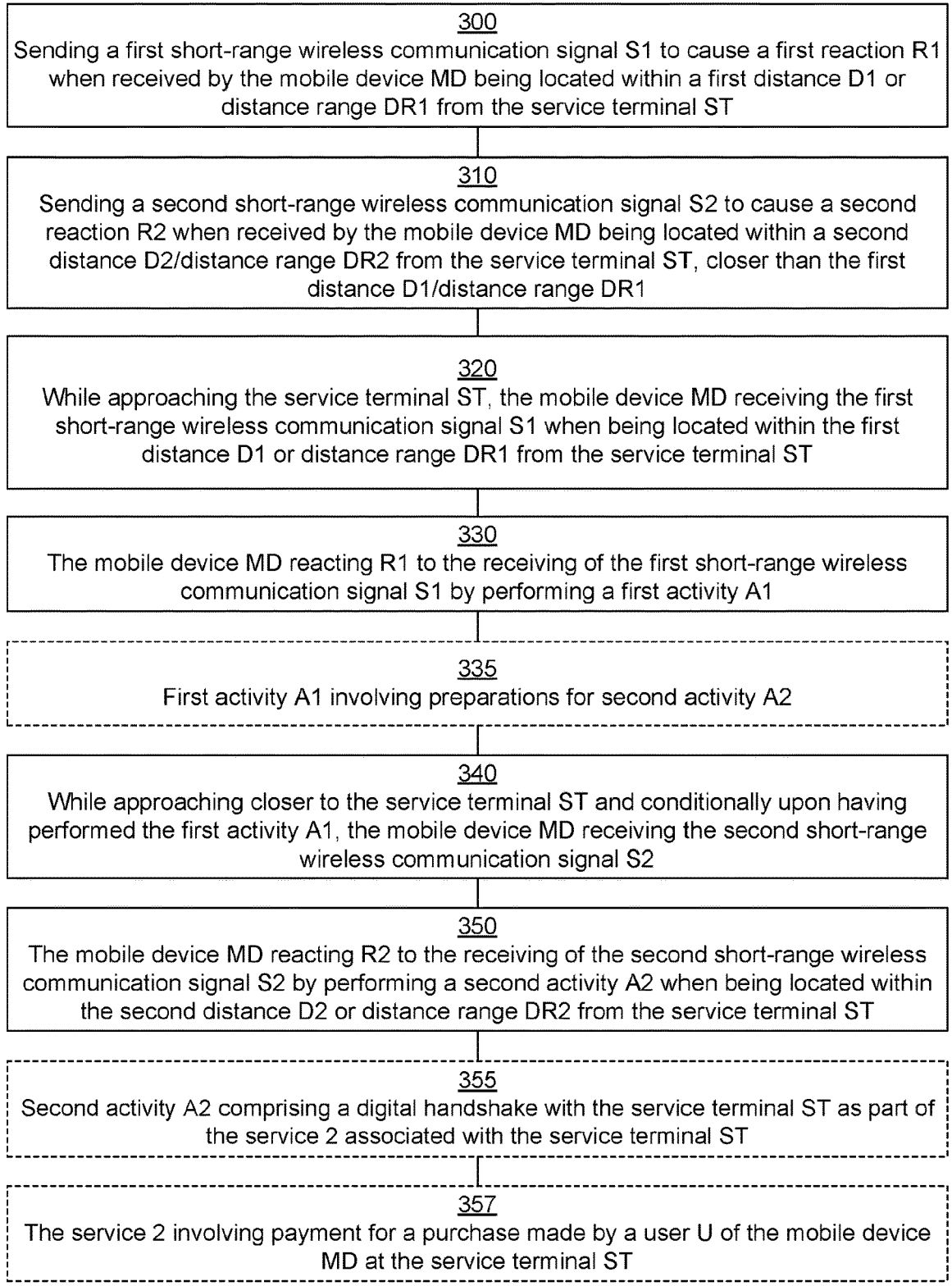
FIG. 3 is a flowchart diagram of a method of activating a mobile device to enable use of a service associated with a service terminal, generally according to the present invention.

Corresponding functionality is disclosed in the steps 300-357 in the flowchart diagram in FIG. 3.

In some embodiments, at least one of the first short-range wireless communication signal S1 and second short-range wireless communication signal S2 is a Bluetooth Low Energy signal. In some embodiments, at least one of the first short-range wireless communication signal S1 and second short-range wireless communication signal S2 is a beacon advertisement signal, as referred to in the Background section of this document.

Particularly in such embodiments, the first activity A1 may comprise switching from a first mode in which the mobile device MD performs monitoring of short-range wireless communication signals to a second mode in which the mobile device MD performs ranging of short-range wireless communication signals. For a brief description of monitoring and ranging, reference is made to the Background section of this document.

When in the second mode of performing ranging, the mobile device MD may be configured to determine from the received second short-range wireless communication signal S2 that the mobile device MD is located within the second distance D2 or distance range DR2 from the service terminal ST and accordingly react R2 by performing the second activity A2.

An improvement in reaction speed is obtained, compared to prior art, by using the first short-range wireless communication signal S1 (having a longer range) to cause the mobile device MD to enter the ranging mode as preparation of the receipt of and reaction to the second short-range wireless communication signal S2 (having a shorter range).

Figure 2C:
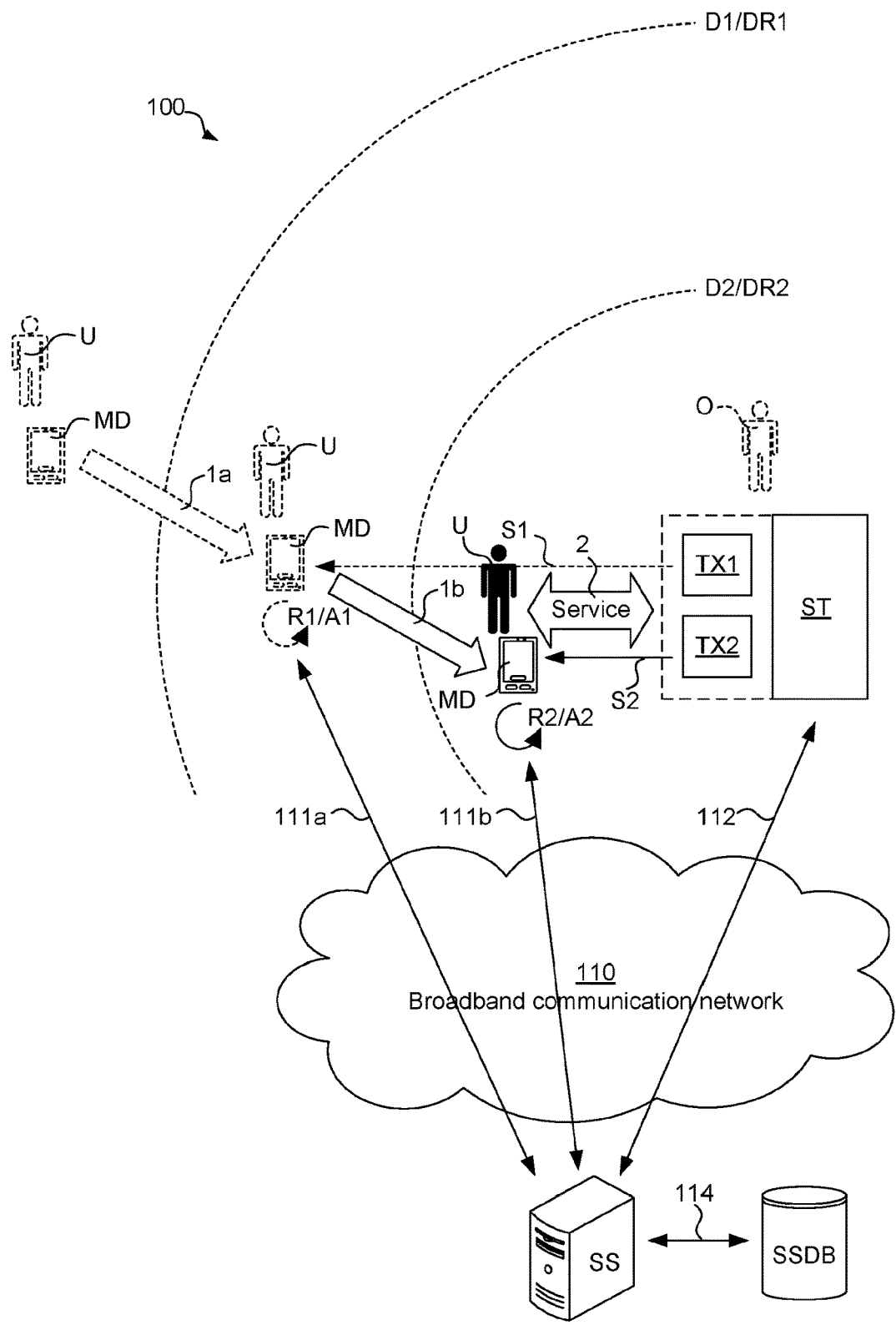
FIG. 2C illustrates an embodiment of the communication system of FIGS. 2A and 2B, including a system server which may communicate with the mobile terminal during the first and/or second reactions, and/or with the service terminal during performance of the service.

In some embodiments, a system server SS is comprised in the communication system 100. This is illustrated in FIG. 2C. The system server SS may have an associated database or other storage SSDB which it may access as needed, see 114. The first activity A1 may involve broadband data communication 111*a* between the mobile device MD and the system server SS over a broadband communication network 110. Likewise, the second activity A2 and the service 2 may involve broadband data communication 111*b*, 112 with the system server SS over the broadband communication network 110.

The system server SS may, for instance, be a server computer, a cluster of such computer devices, or a cloud computing resource or service. It has a processing unit in the form of, for instance, one or more CPUs and/or DSPs, and is programmed to perform its functionality as described in this document by the processing unit executing program instructions of a computer program. The storage SSDB may, for instance, be a database included in or external to the server computing device. The broadband communication network 110 may, for instance, be a mobile communications network compliant with, for instance, WCDMA, HSPA, GSM, UTRAN, UMTS, LTE or LTE, and the broadband data communication 111*a*, 111*b*, 112 may, for instance, be TCP/IP traffic, possibly encrypted or otherwise secured.

In some embodiments, the service 2 involves digital payment for a purchase made by the user U of the mobile device MD at the service terminal ST. To this end, the service terminal ST may be, for instance, a point-of-sales terminal, checkout counter, delivery pickup point, vending machine or ticket machine.

In some embodiments, the second activity A2 comprises making a digital handshake with the service terminal ST as part of the service 2 associated with the service terminal ST. As explained in the Background section of this document, the digital handshake may be an affirmative action which is required in order for the service 2 (such as, for instance, a digital payment for a purchase) to be performed or completed. The digital handshake may be made physically by the user U bringing the mobile device MD very close to the service terminal ST (within, for instance, 10-30 cm or 5-50 cm), and logically by one or both of the mobile device MD and service terminal ST verifying the respective identity of the other device/terminal.

Figure 2D:
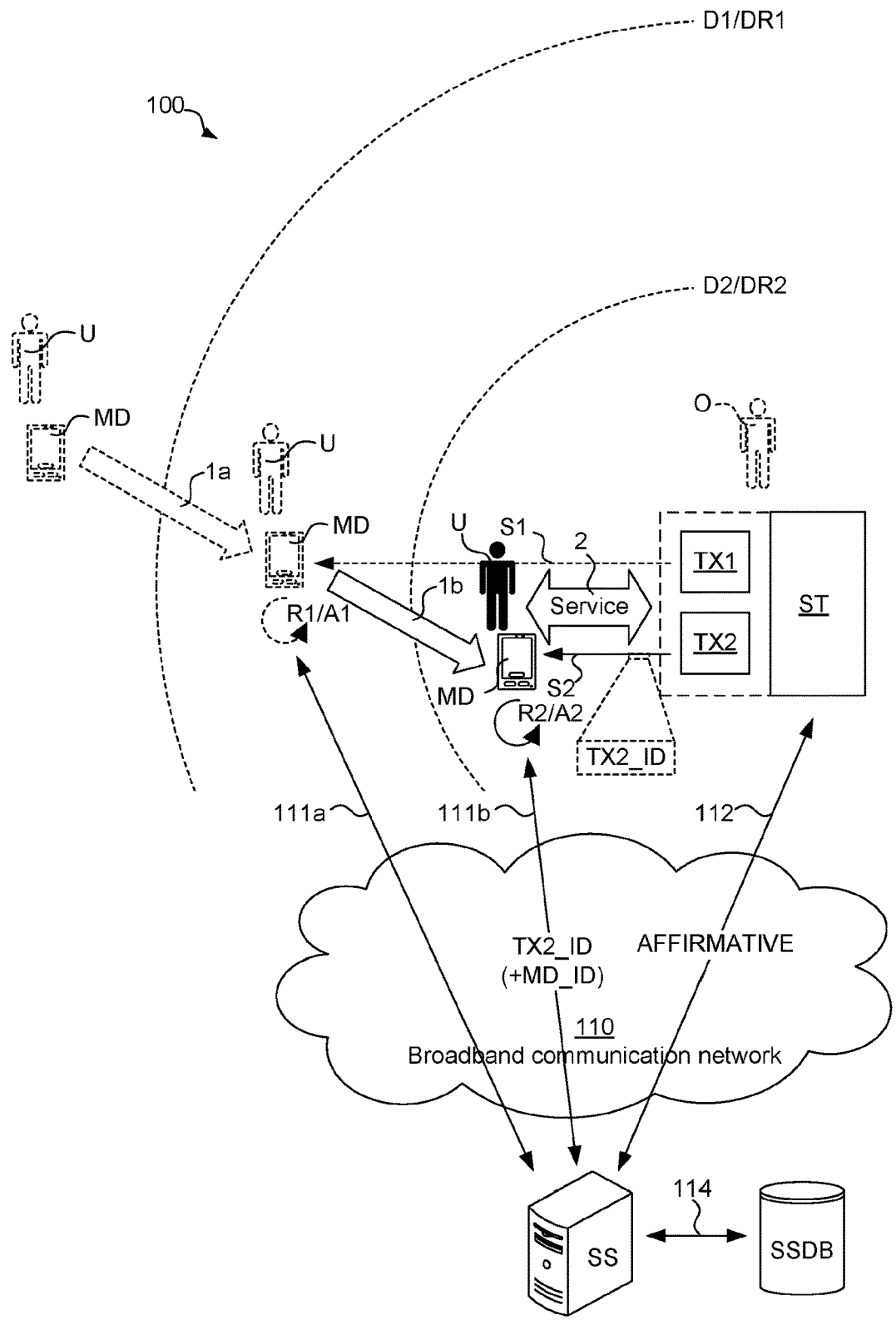
FIG. 2D illustrates an embodiment of the communication system of FIG. 2C, designed for a use case which involves a digital handshake between the mobile device and the service terminal as an affirmative action required in order for the service to be performed or completed.

Advantageously, the digital handshake involves the following procedure, which is illustrated in FIG. 2D:
  The mobile device MD detecting, from the received second short-range wireless communication signal S2, identity information TX2_ID which is associated with the second transmitter function TX2 or the service terminal ST.
  The mobile device MD reporting the detected identity information TX2_ID to the system server SS by long-range broadband data communication 111*b*. The mobile device MD may also report identity information MD_ID about itself.
  The system server SS in response causing performance of the service 2. This may involve verifying the reported identity information TX2_ID and/or any reported identity information MD_ID for the mobile device MD against contents in the storage SSDB, or by placing a verification request with an external network resource, and then—upon successful verification—communicating 112 affirmative information to the service terminal ST to allow it to initiate, proceed with or complete the service 2 (such as, for instance, performing a digital payment).

Figure 2E:
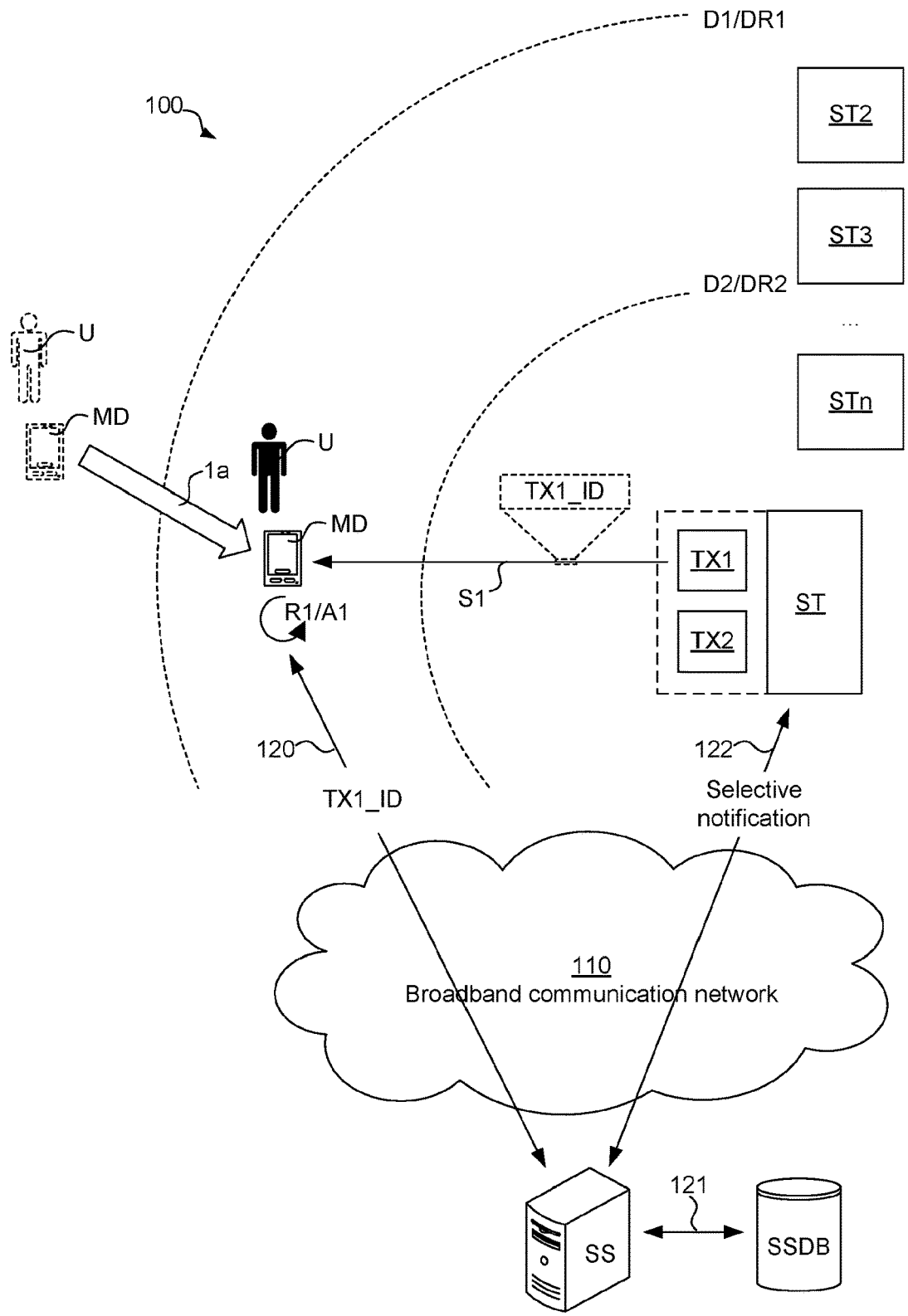
FIG. 2E illustrates an embodiment of the communication system of FIG. 2C, designed for a use case which involves selective notification of the service terminal among a plurality of additional service terminals.

FIG. 2E illustrates an embodiment of the communication system 100 of FIG. 2C, designed for a use case which involves selective notification of the service terminal ST among a plurality of additional service terminals ST2, ST3, . . . , STn in the communication system 100. The first activity A1 involves the following procedure:
  The mobile device MD detecting, from the received first short-range wireless communication signal S1, identity information TX1_ID associated with the first transmitter function TX1 or the service terminal ST.
  The mobile device MD reporting the detected identity information TX1_ID to the system server SS by long-range broadband data communication 120. The system server SS may access the storage SSDB, and thus determine that the first transmitter function TX1 as represented by the reported detected identity information TX1_ID belongs to the service terminal ST and not any of the other service terminals ST2, ST3, . . . , STn. Conclusively, the user U and the mobile device MD are approaching the service terminal ST rather than any of the other service terminals ST2, ST3, . . . , STn.
  The system server SS in response selectively notifying the service terminal ST, but not the additional service terminals ST2, ST3, . . . , STn, by long-range broadband data communication 122. This may give the service terminal ST and/or its operator O valuable advance notice that the user U is approaching the service terminal ST and is soon likely to require the service 2. As one example, the advance notice may be used to start pre-packing or other form of delivery preparations for a pre-ordered purchase involving one or more purchase items.

Figure 2F:
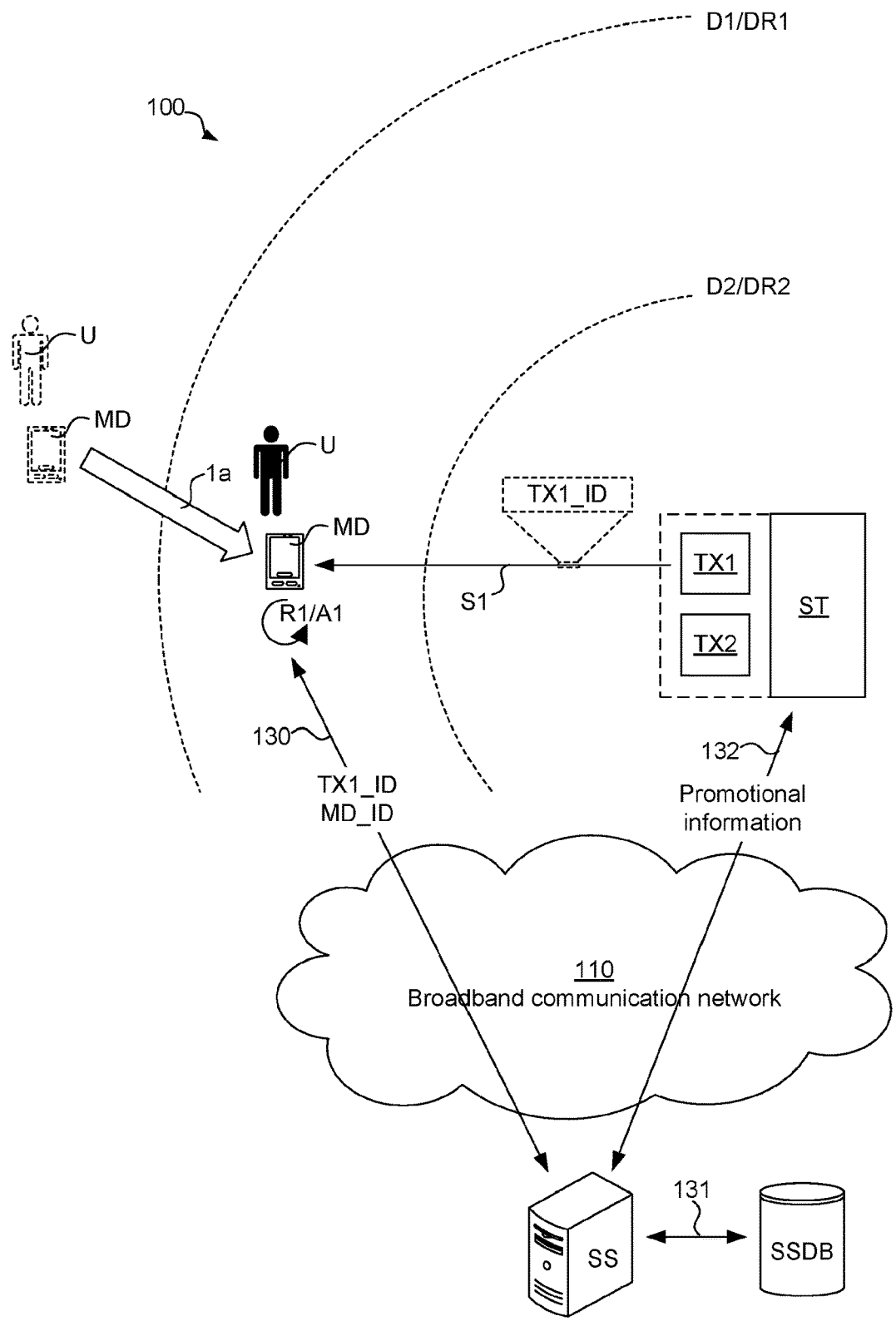
FIG. 2F illustrates an embodiment of the communication system of FIG. 2C, designed for a use case which involves providing promotional information, customized for the user of the mobile device, on the service terminal.

FIG. 2F illustrates an embodiment of the communication system 100 of FIG. 2C, designed for a use case that involves providing promotional information, customized for the user U of the mobile device MD, on the service terminal ST. In this embodiment, the first activity A1 involves the following procedure:
  The mobile device MD detecting, from the received first short-range wireless communication signal S1, identity information TX1_ID associated with the first transmitter function TX1 or the service terminal ST.
  The mobile device MD reporting the detected identity information TX1_ID associated with the first transmitter function TX1 as well as identity information MD_ID associated with the mobile device MD to the system server SS by long-range broadband data communication 130.
  The system server SS in response:
    Determining an identity of the user U of the mobile device MD from the identity information MD_ID associated with the mobile device MD.
    Determining promotional information customized for the user U. The system server SS may access the storage SSDB, determine particulars about the user U based on the reported identity information MD_ID, and use these particulars to compile promotional information customized for the user U.
    Communicating the determined customized promotional information to the service terminal ST by long-range broadband data communication 132.
  The service terminal ST presenting the communicated customized promotional information by a presentation device 175 (see FIG. 5) to the user U of the mobile device MD. To this end, the service terminal ST may, for instance, be a point-of-sales terminal or a digital signage terminal, or a combination thereof.

Figure 2G:
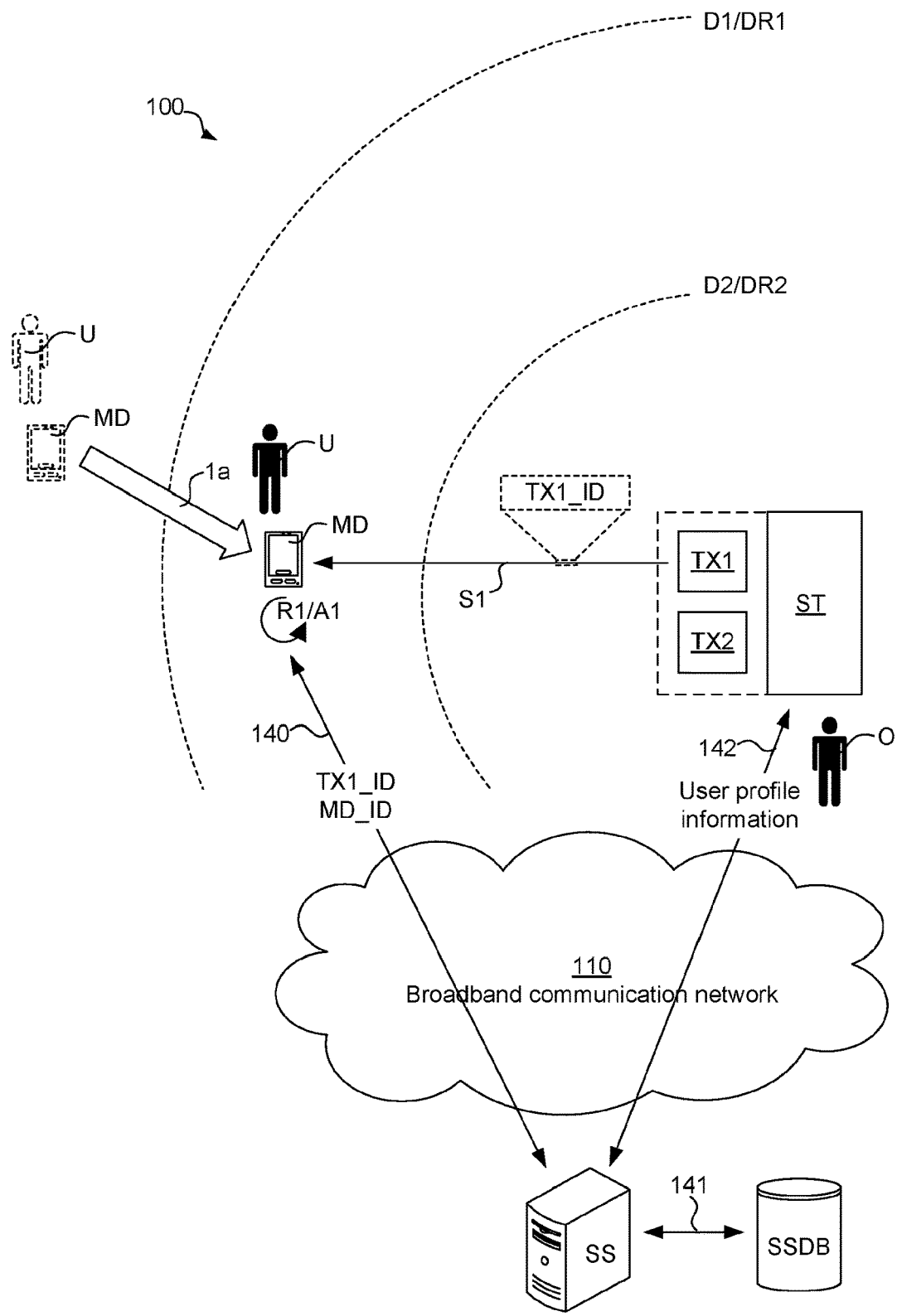
FIG. 2G illustrates an embodiment of the communication system of FIG. 2C, designed for a use case which involves determining user profile information associated with the user of the mobile device and presenting it on the service terminal to an operator thereof and/or to the user of the mobile device.

FIG. 2G illustrates an embodiment of the communication system 100 of FIG. 2C, designed for a use case that involves determining user profile information associated with the user U of the mobile device MD and presenting it on the service terminal ST to the operator O and/or to the user U. In this embodiment, the first activity A1 involves the following procedure:

The mobile device MD detecting, from the received first short-range wireless communication signal S1, identity information TX1_ID associated with the first transmitter function TX1 or the service terminal ST.

The mobile device MD reporting the detected identity information TX1_ID associated with the first transmitter function TX1 as well as identity information MD_ID associated with the mobile device MD to the system server SS by long-range broadband data communication 140.

The system server SS in response:

Determining an identity of the user U of the mobile device MD from the identity information MD_ID associated with the mobile device MD.

Determining user profile information associated with the user U. The system server SS may access the storage SSDB to identify the user U from the reported identity information MD_ID, and then retrieve the user profile information for the user U.

Communicating the determined user profile information to the service terminal ST by long-range broadband data communication 142.

The service terminal ST presenting the communicated user profile information by the presentation device 175 to the operator O of the service terminal ST and/or to the user U of the mobile device MD. The user profile information may, for instance, comprise membership or account status information, a picture of the user U, name information for the user U, etc.

Another use case involves physical access control. In such a case, the service terminal ST may be, or comprise, a device for controlling access to a protected area or premises. Hence, the service 2 may be a service that gives the user U access to the protected area or premises. For instance, the service terminal ST may be a wireless lock actuating device being mounted to or at a door or similar and comprising an electric motor or other actuator for actuating a mechanical or electrical lock of the door or similar upon successful communication with the mobile device MD. The user U may use the mobile device MD as an electronic key device to obtain access to the protected area or premises by causing the service terminal ST in the form of the wireless lock actuating device to actuate the mechanical or electrical lock. To this end, the second activity A2 may involve the mobile device MD communicating certain access control verification data to the service terminal ST, which may use the access control verification data to verify that the mobile device MD/user U has the credentials for being granted access to the protected area or premises. Upon successful verification of the access control verification data, the service terminal ST may actuate the mechanical or electrical lock to unlock the door or similar. In some embodiments, the mobile device MD/user U may similarly control the service terminal ST to actuate the mechanical or electrical lock to lock the door or similar when being in an unlocked state. The access control verification data provided by the mobile device MD/user U may, for instance, include a digital token, signature, password, passcode or biometrical data (fingerprint, face, iris, retina, voice, etc), or any combination thereof.

Figure 4:
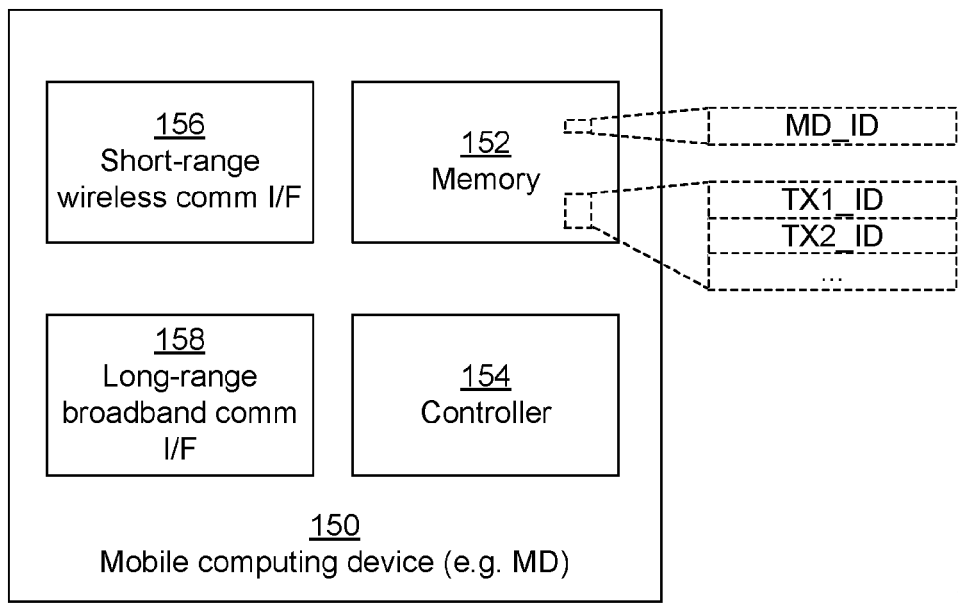
FIG. 4 illustrates a mobile computing device which may implement the mobile device as described in this document.

FIG. 4 illustrates a mobile computing device 150 which may implement the mobile device MD. The mobile computing device 150 comprises a memory 152 for storing an identity (such as the aforementioned MD_ID) associated with the mobile computing device 150 (e.g. MD). The mobile computing device 150 also comprises a controller 154, a short-range wireless communication interface 156, and a long-range broadband communication interface 158. The controller 154 may be configured for performing the functionality defined for the mobile device MD in the communication system 100 as described herein.

The mobile computing device 150 may, for instance, be a mobile phone, tablet computer, personal digital assistant, smart glasses, smart watch, smart bracelet or wireless lock actuating device. The controller 154 may be a processing unit in the form of, for instance, one or more microcontrollers, CPUs and/or DSPs, being programmed to perform its functionality as described in this document by the processing unit executing program instructions of a computer program. To this end, the mobile computing device 150 may have computer program code for an app, or similar program, stored in the memory 152 and executable by the controller 154 to perform the functionality of the mobile device MD. Alternatively, the controller 154 may be implemented as an FPGA, ASIC, etc. Even if not shown in FIG. 4, the mobile computing device 150 may comprise a user interface including a presentation device and an input device, much like the user interface 173 with its presentation device 175 and input device 177 of the computing device 170 in FIG. 5.

Copies of identity information TX1_ID and/or TX2_ID for the first and/or second transmitter functions TX1, TX2 of the service terminal ST may be stored in the memory 152 of the mobile computing device 150, to facilitate detection (e.g. monitoring, ranging) of the first and/or second signals S1, S2.

Figure 5:
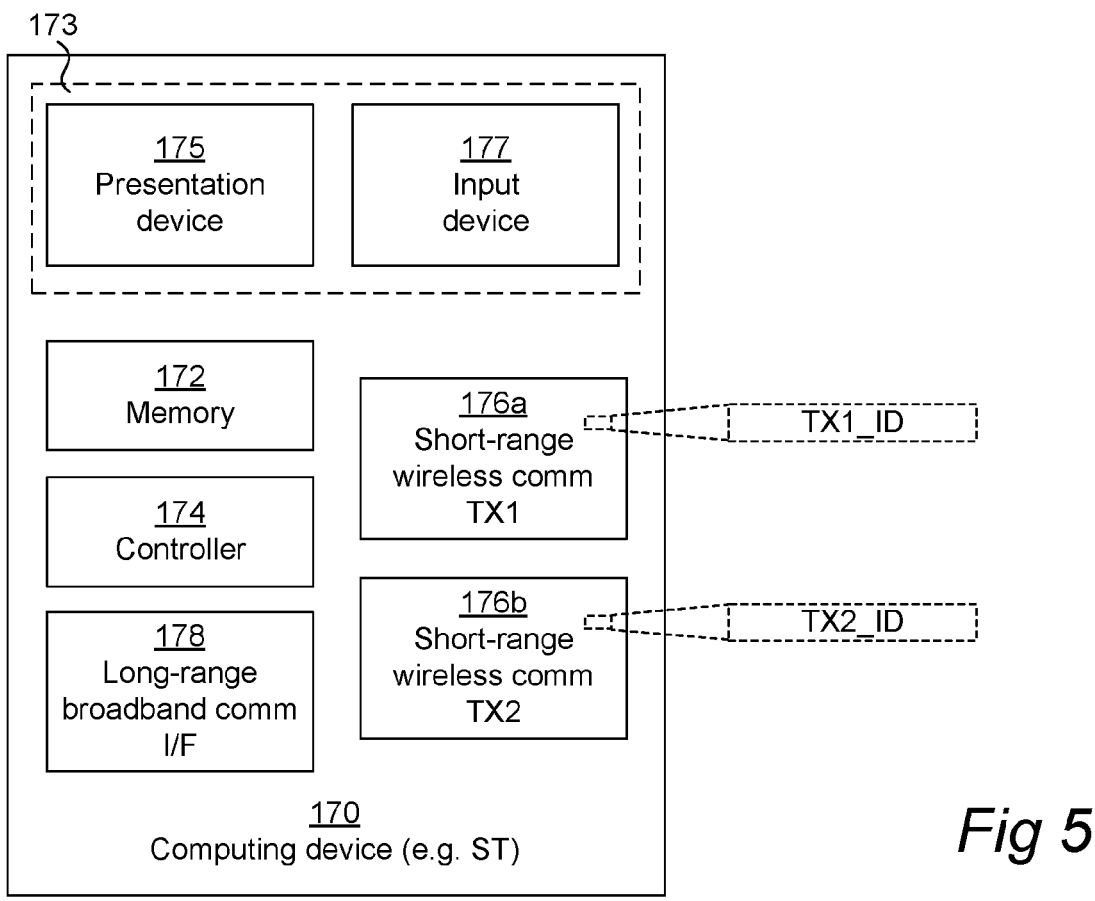
FIG. 5 illustrates a computing device which may implement the service terminal as described in this document.

FIG. 5 illustrates a computing device 170 which may implement the service terminal ST. The computing device 170 comprises a memory 172, a controller 174, a first transmitter function 176a for short-range wireless communication (e.g. implementing the first transmitter function TX1 of the service terminal ST), and a second transmitter function 176b for short-range wireless communication (e.g. implementing the second transmitter function TX2 of the service terminal ST).

The computing device 170 may, for instance, be a tablet computer, laptop computer, mobile phone, desktop computer, personal digital assistant, smart glasses, smart watch, smart bracelet, service terminal apparatus, machine or vehicle. The controller 174 may be a processing unit in the form of, for instance, one or more CPUs and/or DSPs, being programmed to perform its functionality as described in this document by the processing unit executing program instructions of a computer program. To this end, the computing device 170 may have computer program code stored in the memory 172 and executable by the controller 174 to perform the functionality for the service terminal ST as defined in this document. Alternatively, the controller 174 may be implemented as an FPGA, ASIC, etc.

In some embodiments, the first and second transmitter functions TX1, TX2 in or at the service terminal ST are configured for sending the first and second short-range wireless communication signals S1, S2 at respective defined periodicities. These periodicities may be the same or different.

In some embodiments, the first and second transmitter functions TX1, TX2 in or at the service terminal ST are configured for sending the first and second short-range wireless communication signals S1, S2 at respective transmission power levels, the transmission power level of the first short-range wireless communication signal S1 being higher than the transmission power level of the second short-range wireless communication signal S2. In this way, the first distance D1/distance range DR1 is made farther than the second distance D2/distance range DR2.

In some embodiments, the first and second transmitter functions TX1, TX2 in or at the service terminal ST are configured for sending the first and second short-range wireless communication signals S1, S2 with respective and different radio signals propagation profiles. For instance, one of the radio signals propagation profiles may be more or less omni-directional, whereas the other of the radio signals propagation profiles may have a narrower directional coverage. This may be advantageous since it may reduce the risk of activating other signal receivers than the intended mobile device MD.

In some embodiments, one or both of the first and second transmitter functions TX1, TX2 is/are separate transmitter device(s) being positioned external to but physically near the service terminal ST. Physically near may include the transmitter device(s) being mounted at ceiling level or floor level.

In some embodiments, one or both of the first and second transmitter functions TX1, TX2 are implemented by short-range wireless communication circuitry comprised in the service terminal ST.

In some embodiments, both of the first and second transmitter functions TX1, TX2 are implemented by a common separate transmitter device which is positioned external to but physically near the service terminal ST.

In some embodiments, both of the first and second transmitter functions TX1, TX2 are implemented by common short-range wireless communication circuitry comprised in the service terminal ST. Hence, in such embodiments, two logical transmitter functions TX1, TX2 may be implemented by one single physical transmitter unit.

One or both of the first and second transmitter functions TX1, TX2 may be part of a transceiver function, i.e. they may also have a receiver function.

Even though BLE is presently considered an advantageous short-range wireless communication technology for the first and second transmitter functions TX1, TX2, other technologies are also conceivable, including but not limited to near-field communication (NFC), radio frequency identification (RFID), wireless LAN (WLAN, WiFi), or another form of proximity-based device-to-device radio communication signal such as LTE Direct.

The invention has mainly been described above with reference to a few embodiments. However, as is readily appreciated by a person skilled in the art, other embodiments than the ones disclosed above are equally possible within the scope of the invention, as defined by the appended patent claims.

What is claimed is:

1. A communication system comprising:
a mobile device;
a service terminal;
a first transmitter function in or at the service terminal, the first transmitter function being configured for sending a first short-range wireless communication signal to cause a first reaction when received by the mobile device being located within a first distance or distance range from the service terminal; and
a second transmitter function in or at the service terminal, the second transmitter function being configured for sending a second short-range wireless communication signal to cause a second reaction when received by the mobile device being located within a second distance or distance range from the service terminal, the second distance or distance range being closer to the service terminal than the first distance or distance range,
wherein the mobile device is configured for:
while approaching the service terminal:
receiving the first short-range wireless communication signal when being located within the first distance or distance range from the service terminal;
reacting to the receiving of the first short-range wireless communication signal by performing a first activity;
while approaching closer to the service terminal and conditionally upon having performed the first activity:
receiving the second short-range wireless communication signal; and
reacting to the receiving of the second short-range wireless communication signal by performing a second activity when being located within the second distance or distance range from the service terminal,
wherein the first activity involves preparations for the second activity,
wherein the second activity involves participation in a service associated with the service terminal, and
wherein the service involves digital payment for a purchase made by a user of the mobile device at the service terminal.

2. The communication system as defined in claim 1, wherein the first activity comprises switching from a first mode in which the mobile device performs monitoring of short-range wireless communication signals to a second mode in which the mobile device performs ranging of short-range wireless communication signals.

3. The communication system as defined in claim 1, wherein at least one of the first short-range wireless communication signal and second short-range wireless communication signal is a Bluetooth Low Energy signal.

4. The communication system as defined in claim 1, wherein at least one of the first short-range wireless communication signal and second short-range wireless communication signal is a beacon advertisement signal.

5. The communication system as defined in claim 2, wherein, in the second mode of performing ranging, the mobile device is configured to determine from the received second short-range wireless communication signal that the mobile device is located within the second distance or distance range from the service terminal and accordingly react by performing the second activity.

6. The communication system as defined in claim 1, wherein the second activity comprises making a digital handshake with the service terminal as part of the service associated with the service terminal.

7. The communication system as defined in claim 6 and further comprising a system server, wherein the second activity comprises making the digital handshake with the service terminal by:
the mobile device detecting, from the received second short-range wireless communication signal, identity information associated with the second transmitter function or the service terminal;
the mobile device reporting the detected identity information to the system server by long-range broadband data communication; and
the system server, in response, causing performance of the service.

8. The communication system as defined in claim 1, wherein the service terminal is a point-of-sales terminal.

9. The communication system as defined in claim 1 and further comprising a system server and one or more additional service terminals, wherein the first activity involves:

the mobile device detecting, from the received first short-range wireless communication signal, identity information associated with the first transmitter function or the service terminal;

the mobile device reporting the detected identity information to the system server by long-range broadband data communication; and the system server in response selectively notifying the service terminal, but not said additional service terminals, by long-range broadband data communication.

10. The communication system as defined in claim 1 and further comprising a system server, the service terminal comprising a presentation device, wherein the first activity involves:

the mobile device detecting, from the received first short-range wireless communication signal, identity information associated with the first transmitter function or the service terminal;

the mobile device reporting the detected identity information associated with the first transmitter function as well as identity information associated with the mobile device to the system server by long-range broadband data communication;

the system server in response:

determining an identity of a user of the mobile device from the identity information associated with the mobile device;

determining promotional information customized for the user; and communicating the determined promotional information to the service terminal by long-range broadband data communication; and the service terminal presenting the communicated promotional information by the presentation device to the user of the mobile device.

11. The communication system as defined in claim 1 and further comprising a system server, the service terminal comprising a presentation device, wherein the first activity involves:

the mobile device detecting, from the received first short-range wireless communication signal, identity information associated with the first transmitter function or the service terminal;

the mobile device reporting the detected identity information associated with the first transmitter function as well as identity information associated with the mobile device to the system server by long-range broadband data communication;

the system server in response:

determining an identity of a user of the mobile device from the identity information associated with the mobile device, determining user profile information associated with the user, and communicating the determined user profile information to the service terminal by long-range broadband data communication; and the service terminal presenting the communicated user profile information by the presentation device to an operator of the service terminal and/or to the user of the mobile device.

12. The communication system as defined in claim 1, wherein the first and second transmitter functions in or at the service terminal are configured for sending the first and second short-range wireless communication signals at respective defined periodicities.

13. The communication system as defined in claim 1, wherein the first and second transmitter functions in or at the service terminal are configured for sending the first and second short-range wireless communication signals at respective transmission power levels, the transmission power level of the first short-range wireless communication signal being higher than the transmission power level of the second short-range wireless communication signal.

14. The communication system as defined in claim 1, wherein the first and second transmitter functions in or at the service terminal are configured for sending the first and second short-range wireless communication signals with respective and different radio signals propagation profiles.

15. The communication system as defined in claim 1, wherein one or both of the first and second transmitter functions is/are separate transmitter device(s) being positioned external to but physically near the service terminal.

16. The communication system as defined in claim 1, one or both of the first and second transmitter functions being implemented by short-range wireless communication circuitry comprised in the service terminal.

17. The communication system as defined in claim 1, wherein both of the first and second transmitter functions are implemented by a common separate transmitter device which is positioned external to but physically near the service terminal.

18. The communication system as defined in claim 1, wherein both of the first and second transmitter functions are implemented by common short-range wireless communication circuitry comprised in the service terminal.

19. A method of activating a mobile device to enable use of a service associated with a service terminal, the method involving:

sending a first short-range wireless communication signal to cause a first reaction when received by the mobile device being located within a first distance or distance range from the service terminal; and sending a second short-range wireless communication signal to cause a second reaction when received by the mobile device being located within a second distance or distance range from the service terminal, the second distance or distance range being closer to the service terminal than the first distance or distance range, wherein the method further comprises:

the mobile device, while approaching the service terminal:

receiving the first short-range wireless communication signal when being located within the first distance or distance range from the service terminal, and reacting to the receiving of the first short-range wireless communication signal by performing a first activity; and the mobile device, while approaching closer to the service terminal and conditionally upon having performed the first activity:

receiving the second short-range wireless communication signal, and reacting to the receiving of the second short-range wireless communication signal by performing a second activity when being located within the second distance or distance range from the service terminal, wherein the service involves payment for a purchase made by a user of the mobile device at the service terminal.

20. The method as defined in claim 19, wherein the first activity involves preparations for the second activity and wherein the second activity involves participation in the service associated with the service terminal.

21. The method as defined in claim 19, wherein the first activity comprises switching from a first mode in which the mobile device performs monitoring of short-range wireless communication to a second mode in which the mobile device performs ranging of short-range wireless communication signals.

22. The method as defined in claim 19, wherein the second activity comprises making a digital handshake with the service terminal as part of the service associated with the service terminal.

23. A mobile computing device comprising:
a controller;
a short-range wireless communication interface; and
a long-range broadband communication interface,
wherein the mobile computing device is configured for:
 receiving a first short-range wireless communication signal when being located within a first distance or distance range from a service terminal;
 reacting to the receiving of the first short-range wireless communication signal by performing a first activity;
 while approaching closer to the service terminal and conditionally upon having performed the first activity, receiving a second short-range wireless communication signal; and
 reacting to the receiving of the second short-range wireless communication signal by performing a second activity when being located within a second distance or distance range from the service terminal,
 wherein the first activity involves preparations for the second activity,
 wherein the second activity involves participation in a service associated with the service terminal, and
 wherein the service involves digital payment for a purchase made by a user of the mobile device at the service terminal.

24. A memory comprising computer program code, the computer program code being executable by a controller to cause a mobile computing device to:
 receive a first short-range wireless communication signal when being located within a first distance or distance range from a service terminal;
 react to the receiving of the first short-range wireless communication signal by performing a first activity;
 while approaching closer to the service terminal and conditionally upon having performed the first activity, receive a second short-range wireless communication signal; and
 react to the receiving of the second short-range wireless communication signal by performing a second activity when being located within a second distance or distance range from the service terminal,
 wherein the service involves payment for a purchase made by a user of the mobile device at the service terminal.

25. A communication system comprising:
a mobile device;
a service terminal;
a first transmitter function in or at the service terminal, the first transmitter function being configured for sending a first short-range wireless communication signal to cause a first reaction when received by the mobile device being located within a first distance or distance range from the service terminal; and
a second transmitter function in or at the service terminal, the second transmitter function being configured for sending a second short-range wireless communication signal to cause a second reaction when received by the mobile device being located within a second distance or distance range from the service terminal, the second distance or distance range being closer to the service terminal than the first distance or distance range,
wherein the mobile device is configured for:
while approaching the service terminal:
 receiving the first short-range wireless communication signal when being located within the first distance or distance range from the service terminal;
 reacting to the receiving of the first short-range wireless communication signal by performing a first activity;
 while approaching closer to the service terminal and conditionally upon having performed the first activity:
 receiving the second short-range wireless communication signal; and
 reacting to the receiving of the second short-range wireless communication signal by performing a second activity when being located within the second distance or distance range from the service terminal,
 wherein the first activity involves preparations for the second activity,
 wherein the second activity involves participation in a service associated with the service terminal, and
 wherein the second activity comprises making a digital handshake with the service terminal as part of the service associated with the service terminal.

26. The communication system as defined in claim 25, wherein the first activity comprises switching from a first mode in which the mobile device performs monitoring of short-range wireless communication signals to a second mode in which the mobile device performs ranging of short-range wireless communication signals.

27. The communication system as defined in claim 26, wherein, in the second mode of performing ranging, the mobile device is configured to determine from the received second short-range wireless communication signal that the mobile device is located within the second distance or distance range from the service terminal and accordingly react by performing the second activity.

28. The communication system as defined in claim 25, wherein at least one of the first short-range wireless communication signal and second short-range wireless communication signal is a Bluetooth Low Energy signal.

29. The communication system as defined in claim 25, wherein at least one of the first short-range wireless communication signal and second short-range wireless communication signal is a beacon advertisement signal.

30. The communication system as defined in claim 29 and further comprising a system server, wherein the second activity comprises making the digital handshake with the service terminal by:
the mobile device detecting, from the received second short-range wireless communication signal, identity information associated with the second transmitter function or the service terminal;
the mobile device reporting the detected identity information to the system server by long-range broadband data communication; and
the system server, in response, causing performance of the service.

31. The communication system as defined in claim 25, wherein the service involves digital payment for a purchase made by a user of the mobile device at the service terminal.

32. The communication system as defined in claim 25, wherein the service terminal is a point-of-sales terminal.

33. The communication system as defined in claim 25 and further comprising a system server and one or more additional service terminals, wherein the first activity involves:
- the mobile device detecting, from the received first short-range wireless communication signal, identity information associated with the first transmitter function or the service terminal;
- the mobile device reporting the detected identity information to the system server by long-range broadband data communication; and
- the system server in response selectively notifying the service terminal, but not said additional service terminals, by long-range broadband data communication.

34. The communication system as defined in claim 25 and further comprising a system server, the service terminal comprising a presentation device, wherein the first activity involves:
- the mobile device detecting, from the received first short-range wireless communication signal, identity information associated with the first transmitter function or the service terminal;
- the mobile device reporting the detected identity information associated with the first transmitter function as well as identity information associated with the mobile device to the system server by long-range broadband data communication;
- the system server in response:
  - determining an identity of a user of the mobile device from the identity information associated with the mobile device;
  - determining promotional information customized for the user; and
  - communicating the determined promotional information to the service terminal by long-range broadband data communication; and
- the service terminal presenting the communicated promotional information by the presentation device to the user of the mobile device.

35. The communication system as defined in claim 25 and further comprising a system server, the service terminal comprising a presentation device, wherein the first activity involves:
- the mobile device detecting, from the received first short-range wireless communication signal, identity information associated with the first transmitter function or the service terminal;
- the mobile device reporting the detected identity information associated with the first transmitter function as well as identity information associated with the mobile device to the system server by long-range broadband data communication;
- the system server in response:
  - determining an identity of a user of the mobile device from the identity information associated with the mobile device,
  - determining user profile information associated with the user, and
  - communicating the determined user profile information to the service terminal by long-range broadband data communication; and
- the service terminal presenting the communicated user profile information by the presentation device to an operator of the service terminal and/or to the user of the mobile device.

36. The communication system as defined in claim 25, wherein the first and second transmitter functions in or at the service terminal are configured for sending the first and second short-range wireless communication signals at respective defined periodicities.

37. The communication system as defined in claim 25, wherein the first and second transmitter functions in or at the service terminal are configured for sending the first and second short-range wireless communication signals at respective transmission power levels, the transmission power level of the first short-range wireless communication signal being higher than the transmission power level of the second short-range wireless communication signal.

38. The communication system as defined in claim 25, wherein the first and second transmitter functions in or at the service terminal are configured for sending the first and second short-range wireless communication signals with respective and different radio signals propagation profiles.

39. The communication system as defined in claim 25, wherein one or both of the first and second transmitter functions is/are separate transmitter device(s) being positioned external to but physically near the service terminal.

40. The communication system as defined in claim 25, one or both of the first and second transmitter functions being implemented by short-range wireless communication circuitry comprised in the service terminal.

41. The communication system as defined in claim 25, wherein both of the first and second transmitter functions are implemented by a common separate transmitter device which is positioned external to but physically near the service terminal.

42. The communication system as defined in claim 25, wherein both of the first and second transmitter functions are implemented by common short-range wireless communication circuitry comprised in the service terminal.

43. A method of activating a mobile device to enable use of a service associated with a service terminal, the method involving:
- sending a first short-range wireless communication signal to cause a first reaction when received by the mobile device being located within a first distance or distance range from the service terminal; and
- sending a second short-range wireless communication signal to cause a second reaction when received by the mobile device being located within a second distance or distance range from the service terminal, the second distance or distance range being closer to the service terminal than the first distance or distance range,
- wherein the method further comprises:
- the mobile device, while approaching the service terminal:
- receiving the first short-range wireless communication signal when being located within the first distance or distance range from the service terminal, and
- reacting to the receiving of the first short-range wireless communication signal by performing a first activity; and
- the mobile device, while approaching closer to the service terminal and conditionally upon having performed the first activity:
- receiving the second short-range wireless communication signal, and
- reacting to the receiving of the second short-range wireless communication signal by performing a second activity when being located within the second distance or distance range from the service terminal,
- wherein the second activity comprises making a digital handshake with the service terminal as part of the service associated with the service terminal.

44. A mobile computing device comprising:
a controller;
a short-range wireless communication interface; and
a long-range broadband communication interface,
wherein the mobile computing device is configured for:
receiving a first short-range wireless communication signal when being located within a first distance or distance range from a service terminal;
reacting to the receiving of the first short-range wireless communication signal by performing a first activity;
while approaching closer to the service terminal and conditionally upon having performed the first activity, receiving the second short-range wireless communication signal; and
reacting to the receiving of the second short-range wireless communication signal by performing a second activity when being located within the second distance or distance range from the service terminal,
wherein the first activity involves preparations for the second activity,
wherein the second activity involves participation in a service associated with the service terminal, and
wherein the second activity comprises making a digital handshake with the service terminal as part of the service associated with the service terminal.

45. A memory comprising computer program code, the computer program code being executable by a controller to cause a mobile computing device to:
receive a first short-range wireless communication signal when being located within a first distance or distance range from a service terminal;
react to the receiving of the first short-range wireless communication signal by performing a first activity;
while approaching closer to the service terminal and conditionally upon having performed the first activity, receive a second short-range wireless communication signal; and
react to the receiving of the second short-range wireless communication signal by performing a second activity when being located within a second distance or distance range from the service terminal,
wherein the second activity comprises making a digital handshake with the service terminal as part of the service associated with the service terminal.

46. A communication system comprising:
a mobile device;
a service terminal;
a first transmitter function in or at the service terminal, the first transmitter function being configured for sending a first short-range wireless communication signal to cause a first reaction when received by the mobile device being located within a first distance or distance range from the service terminal; and
a second transmitter function in or at the service terminal, the second transmitter function being configured for sending a second short-range wireless communication signal to cause a second reaction when received by the mobile device being located within a second distance or distance range from the service terminal, the second distance or distance range being closer to the service terminal than the first distance or distance range,
wherein the mobile device is configured for:
while approaching the service terminal:
receiving the first short-range wireless communication signal when being located within the first distance or distance range from the service terminal;
reacting to the receiving of the first short-range wireless communication signal by performing a first activity;
while approaching closer to the service terminal and conditionally upon having performed the first activity:
receiving the second short-range wireless communication signal; and
reacting to the receiving of the second short-range wireless communication signal by performing a second activity when being located within the second distance or distance range from the service terminal,
wherein the first activity involves preparations for the second activity, and
wherein the first activity comprises switching from a first mode in which the mobile device performs monitoring of short-range wireless communication signals to a second mode in which the mobile device performs ranging of short-range wireless communication signals.

47. A method of activating a mobile device to enable use of a service associated with a service terminal, the method involving:
sending a first short-range wireless communication signal to cause a first reaction when received by the mobile device being located within a first distance or distance range from the service terminal; and
sending a second short-range wireless communication signal to cause a second reaction when received by the mobile device being located within a second distance or distance range from the service terminal, the second distance or distance range being closer to the service terminal than the first distance or distance range,
wherein the method further comprises:
the mobile device, while approaching the service terminal:
receiving the first short-range wireless communication signal when being located within the first distance or distance range from the service terminal, and
reacting to the receiving of the first short-range wireless communication signal by performing a first activity; and
the mobile device, while approaching closer to the service terminal and conditionally upon having performed the first activity:
receiving the second short-range wireless communication signal, and
reacting to the receiving of the second short-range wireless communication signal by performing a second activity when being located within the second distance or distance range from the service terminal,
wherein the first activity comprises switching from a first mode in which the mobile device performs monitoring of short-range wireless communication to a second mode in which the mobile device performs ranging of short-range wireless communication signals.

48. A communication system comprising:
a mobile device;
a service terminal;
a first transmitter function in or at the service terminal, the first transmitter function being configured for sending a first short-range wireless communication signal to cause a first reaction when received by the mobile device being located within a first distance or distance range from the service terminal; and
a second transmitter function in or at the service terminal, the second transmitter function being configured for sending a second short-range wireless communication signal to cause a second reaction when received by the mobile device being located within a second distance or distance range from the service terminal, the second distance or distance range being closer to the service terminal than the first distance or distance range, wherein the mobile device is configured for:

while approaching the service terminal:

receiving the first short-range wireless communication signal when being located within the first distance or distance range from the service terminal;

reacting to the receiving of the first short-range wireless communication signal by performing a first activity;

while approaching closer to the service terminal and conditionally upon having performed the first activity:

receiving the second short-range wireless communication signal; and reacting to the receiving of the second short-range wireless communication signal by performing a second activity when being located within the second distance or distance range from the service terminal, wherein the first activity involves preparations for the second activity, wherein the second activity involves participation in a service associated with the service terminal;

wherein the communication system further comprises a system server and one or more additional service terminals, wherein the first activity involves:

the mobile device detecting, from the received first short-range wireless communication signal, identity information associated with the first transmitter function or the service terminal;

the mobile device reporting the detected identity information to the system server by long-range broadband data communication; and the system server in response selectively notifying the service terminal, but not said additional service terminals, by long-range broadband data communication.

49. A communication system comprising:

a mobile device;

a service terminal;

a first transmitter function in or at the service terminal, the first transmitter function being configured for sending a first short-range wireless communication signal to cause a first reaction when received by the mobile device being located within a first distance or distance range from the service terminal; and a second transmitter function in or at the service terminal, the second transmitter function being configured for sending a second short-range wireless communication signal to cause a second reaction when received by the mobile device being located within a second distance or distance range from the service terminal, the second distance or distance range being closer to the service terminal than the first distance or distance range, wherein the mobile device is configured for:

while approaching the service terminal:

receiving the first short-range wireless communication signal when being located within the first distance or distance range from the service terminal;

reacting to the receiving of the first short-range wireless communication signal by performing a first activity;

while approaching closer to the service terminal and conditionally upon having performed the first activity:

receiving the second short-range wireless communication signal; and reacting to the receiving of the second short-range wireless communication signal by performing a second activity when being located within the second distance or distance range from the service terminal, wherein the first activity involves preparations for the second activity, wherein the second activity involves participation in a service associated with the service terminal;

wherein the communication system further comprises a system server, the service terminal comprising a presentation device, wherein the first activity involves:

the mobile device detecting, from the received first short-range wireless communication signal, identity information associated with the first transmitter function or the service terminal;

the mobile device reporting the detected identity information associated with the first transmitter function as well as identity information associated with the mobile device to the system server by long-range broadband data communication;

the system server in response:

determining an identity of a user of the mobile device from the identity information associated with the mobile device;

determining promotional information customized for the user; and communicating the determined promotional information to the service terminal by long-range broadband data communication; and the service terminal presenting the communicated promotional information by the presentation device to the user of the mobile device.

50. A communication system comprising:

a mobile device;

a service terminal;

a first transmitter function in or at the service terminal, the first transmitter function being configured for sending a first short-range wireless communication signal to cause a first reaction when received by the mobile device being located within a first distance or distance range from the service terminal; and a second transmitter function in or at the service terminal, the second transmitter function being configured for sending a second short-range wireless communication signal to cause a second reaction when received by the mobile device being located within a second distance or distance range from the service terminal, the second distance or distance range being closer to the service terminal than the first distance or distance range, wherein the mobile device is configured for:

while approaching the service terminal:

receiving the first short-range wireless communication signal when being located within the first distance or distance range from the service terminal;

reacting to the receiving of the first short-range wireless communication signal by performing a first activity;

while approaching closer to the service terminal and conditionally upon having performed the first activity:

receiving the second short-range wireless communication signal; and reacting to the receiving of the second short-range wireless communication signal by performing a second activity when being located within the second distance or distance range from the service terminal, wherein the first activity involves preparations for the second activity, wherein the second activity involves participation in a service associated with the service terminal;

wherein the communication system further comprises a system server, the service terminal comprising a presentation device;

wherein the first activity involves:
the mobile device detecting, from the received first short-range wireless communication signal, identity information associated with the first transmitter function or the service terminal;
the mobile device reporting the detected identity information associated with the first transmitter function as well as identity information associated with the mobile device to the system server by long-range broadband data communication;
the system server in response:
  determining an identity of a user of the mobile device from the identity information associated with the mobile device,
  determining user profile information associated with the user, and
  communicating the determined user profile information to the service terminal by long-range broadband data communication; and
the service terminal presenting the communicated user profile information by the presentation device to an operator of the service terminal and/or to the user of the mobile device.

51. A communication system comprising:
a mobile device;
a service terminal;
a first transmitter function in or at the service terminal, the first transmitter function being configured for sending a first short-range wireless communication signal to cause a first reaction when received by the mobile device being located within a first distance or distance range from the service terminal; and
a second transmitter function in or at the service terminal, the second transmitter function being configured for sending a second short-range wireless communication signal to cause a second reaction when received by the mobile device being located within a second distance or distance range from the service terminal, the second distance or distance range being closer to the service terminal than the first distance or distance range,
wherein the mobile device is configured for:
while approaching the service terminal:
receiving the first short-range wireless communication signal when being located within the first distance or distance range from the service terminal;
reacting to the receiving of the first short-range wireless communication signal by performing a first activity;
while approaching closer to the service terminal and conditionally upon having performed the first activity:
receiving the second short-range wireless communication signal; and
reacting to the receiving of the second short-range wireless communication signal by performing a second activity when being located within the second distance or distance range from the service terminal,
wherein one or both of the first and second transmitter functions is/are separate transmitter device(s) being positioned external to but physically near the service terminal.

52. A communication system comprising:
a mobile device;
a service terminal;
a first transmitter function in or at the service terminal, the first transmitter function being configured for sending a first short-range wireless communication signal to cause a first reaction when received by the mobile device being located within a first distance or distance range from the service terminal; and
a second transmitter function in or at the service terminal, the second transmitter function being configured for sending a second short-range wireless communication signal to cause a second reaction when received by the mobile device being located within a second distance or distance range from the service terminal, the second distance or distance range being closer to the service terminal than the first distance or distance range,
wherein the mobile device is configured for:
while approaching the service terminal:
receiving the first short-range wireless communication signal when being located within the first distance or distance range from the service terminal;
reacting to the receiving of the first short-range wireless communication signal by performing a first activity;
while approaching closer to the service terminal and conditionally upon having performed the first activity:
receiving the second short-range wireless communication signal; and
reacting to the receiving of the second short-range wireless communication signal by performing a second activity when being located within the second distance or distance range from the service terminal,
wherein both of the first and second transmitter functions are implemented by a common separate transmitter device which is positioned external to but physically near the service terminal.

* * * * *